(12) United States Patent
Beghelli

(10) Patent No.: US 10,666,032 B2
(45) Date of Patent: May 26, 2020

(54) BUILT-IN ELECTROMECHANICAL EQUIPMENT FOR CONTROLLING DEVICES IN A BUILDING

(71) Applicant: Beghelli S.p.A., Valsamoggia (IT)

(72) Inventor: Gian Pietro Beghelli, Valsamoggia (IT)

(73) Assignee: Beghelli S.p.A., Valsamoggia (IT)

( * ) Notice: Subject to any disclaimer, the term of this patent is extended or adjusted under 35 U.S.C. 154(b) by 43 days.

(21) Appl. No.: 16/066,677

(22) PCT Filed: Dec. 27, 2016

(86) PCT No.: PCT/IT2016/000307
§ 371 (c)(1),
(2) Date: Jun. 28, 2018

(87) PCT Pub. No.: WO2017/115392
PCT Pub. Date: Jul. 6, 2017

(65) Prior Publication Data
US 2019/0074676 A1 Mar. 7, 2019

(30) Foreign Application Priority Data

Dec. 28, 2015 (IT) .................. 102015000088031

(51) Int. Cl.
*H02G 3/12* (2006.01)
*H05B 47/19* (2020.01)
(Continued)

(52) U.S. Cl.
CPC ........... *H02G 3/12* (2013.01); *G05B 19/0425* (2013.01); *H02G 3/14* (2013.01); *H02J 1/00* (2013.01);
(Continued)

(58) Field of Classification Search
None
See application file for complete search history.

(56) References Cited

U.S. PATENT DOCUMENTS 5,683,166 A 11/1997 Lutzker
6,183,101 B1 2/2001 Chien
(Continued)

FOREIGN PATENT DOCUMENTS

CN 202303006 7/2012
CN 103997330 8/2014
(Continued)

OTHER PUBLICATIONS

Notification of Office Action and Search Report dated Jul. 1, 2019 From the State Intellectual Property Office of the People's Republic of China Re. Application No. 201680076853.0. (7 Pages).
(Continued)

*Primary Examiner* — Sharon E Payne

(57) ABSTRACT

Described is a built-in electromechanical equipment for controlling devices in a building, comprising a cover plate (10), which is coupled to a functional frame (11), incorporating a socket-holder frame (12); the plate (10) and the functional frame (11) are also coupled to a built-in box (16), which contains a power supply device (30). More specifically, the functional frame (11) has a lower protruding rim (14), on which are positioned a series of sensors and contains an electronic circuit (25), equipped with a series of LEDs (26) and a microcontroller (32), which analyses, controls and manages the LEDs (26), the sensors and a series of communication ports (40, 41, 42) of the electronic circuit (25); moreover, between the plate (10) and the functional frame (11) there is a light guide (22), which is coupled to the LEDs (26) and which is configured to uniformly illuminate the outer surface of the plate (10).

13 Claims, 7 Drawing Sheets

(51) Int. Cl.
　　　*G05B 19/042* (2006.01)
　　　*H04L 12/28* (2006.01)
　　　*H02G 3/14* (2006.01)
　　　*H02J 1/00* (2006.01)
　　　*H05B 45/10* (2020.01)

(52) U.S. Cl.
　　　CPC ......... *H04L 12/2803* (2013.01); *H05B 45/10* (2020.01); *H05B 47/19* (2020.01); *G05B 2219/25427* (2013.01); *G05B 2219/2642* (2013.01); *H01H 2300/032* (2013.01); *H04L 2012/2841* (2013.01); *Y02B 90/224* (2013.01); *Y04S 20/14* (2013.01)

(56) References Cited

U.S. PATENT DOCUMENTS

| | | | |
|---|---|---|---|
| 6,578,980 | B1 | 6/2003 | Chen et al. |
| 2011/0228552 | A1 | 9/2011 | Kevelos et al. |
| 2015/0267936 | A1 | 9/2015 | Wright et al. |
| 2017/0116483 | A1* | 4/2017 | Richardson ........ G06K 9/00771 |

FOREIGN PATENT DOCUMENTS

| | | |
|---|---|---|
| CN | 203812522 | 9/2014 |
| CN | 204829715 | 12/2015 |
| DE | 202012012946 | 5/2014 |
| WO | WO 2017/115392 | 7/2017 |

OTHER PUBLICATIONS

International Preliminary Report on Patentability dated Apr. 16, 2018 From the International Preliminary Examining Authority Re. Application No. PCT/IT2016/000307. (6 Pages).

International Search Report and the Written Opinion dated Apr. 26, 2017 From the International Searching Authority Re. Application No. PCT/IT2016/000307. (9 Pages).

Rapporto die Ricerca e Opinione Scritta [Search Report and WIitten Opinion] dated Aug. 18, 2016 From the Mistero Dello SViluppo Economico, Direzione Generale Sciluppo Produttivo e Competitivita Ufficio Italiano Brevetti e Marchi Re. Application No. ITUB20159599. (7 Pages).

* cited by examiner

BUILT-IN ELECTROMECHANICAL EQUIPMENT FOR CONTROLLING DEVICES IN A BUILDING

RELATED APPLICATIONS

This application is a National Phase of PCT Patent Application No. PCT/IT2016/000307 having International filing date of Dec. 27, 2016, which claims the benefit of priority of Italian Patent Application No. 102015000088031 filed on Dec. 28, 2015. The contents of the above applications are all incorporated by reference as if fully set forth herein in their entirety.

FIELD AND BACKGROUND OF THE INVENTION

This invention relates generically to a built-in electromechanical equipment for the control and command of devices in a building and, more specifically, relates to a new "active" plate, which interties and expands the functions of the electrical equipment to which it is associated and which has the characteristic of being able to be combined in a universal fashion with all the commercial frames which can be applied to the so-called "civil series".

The electrical command and actuation equipment of the so-called "civil series", including switches, deviators, sockets and other components of the electrical system, are usually assembled in a modular fashion on supporting frames which are fixed to rectangular boxes, mainly built in to the walls or installed on the outside of the walls.

To provide the correct aesthetical finish and ensure protection of the internal parts use is made of covers for the frame, the so-called "plates", which are suitably shaped to allow access to the switches and the other equipment.

The plates are passive components made of techno-polymers, various types of metals, wood and/or other materials, and they are produced in various shapes, thereby achieving countless aesthetical solutions; in practice, each manufacturer of electrical equipment defines the relative shapes and detailed mechanical dimensions of the relative equipment and, consequently, of the cover plates.

There are no "active" plates currently available, in the sense that the plates of the traditional type only cover the fixing elements of the electrical equipment and do not integrate command, actuation and signalling devices, in order to integrate the operation of the above-mentioned electrical equipment.

SUMMARY OF THE INVENTION

The aim of this invention is therefore to provide a built-in electromechanical equipment which allows the use, as a constructional element, of the cover of the frame of the electrical equipment which is designed to provide, at the same time, the functions for command and actuation of the various devices installed in a building.

Another aim of this invention is to provide a built-in electromechanical equipment which is of the universal type and which, therefore, can be combined with any type of supporting frame of the so-called "civil series".

A further aim of this invention is to provide a built-in electromechanical equipment, which is reliable and safe and which has reduced operating costs, relative to the prior art, due to the advantages achieved.

These and other aims, which are described in more detail below, are achieved by a built-in electromechanical equipment for controlling devices in a building, according to claim 1; other detailed technical features of the built-in electromechanical equipment according to this invention are described in the dependent claims.

Advantageously, the equipment according to this invention includes a plate, without a display, which uses a system for homogeneous illumination of the frame, which is able to summarise coloured light of any tone by means of RGB LEDs; the resulting illumination of the frame has both aesthetic and functional purposes, since the frame may thereby also signal the status of the equipment and its functional evolution.

The equipment also incorporates an electronic circuit with strong functions for interaction with the user and with similar devices installed in a building, in order to integrate and expand the functions of the prior known electromechanical equipment.

Lastly, the equipment has the characteristic of combining in a universal fashion with all the commercial plates, for example which can be applied to the civil series of the "503" box, and introduces new "home automation" and "intelligent building" functions.

BRIEF DESCRIPTION OF THE SEVERAL VIEW OF THE DRAWINGS

The same features and functions mentioned above are precisely also those of a built-in home automation wall box consisting of a universal box which can be inserted as a command component in all the civil series mentioned.

Further features and advantages of the present invention are more apparent in the description below, with reference to a preferred, non-limiting, embodiment of the built-in electromechanical equipment according to this invention, illustrated in the accompanying drawings, in which.

DESCRIPTION OF SPECIFIC EMBODIMENTS OF THE INVENTION

Figure 1:
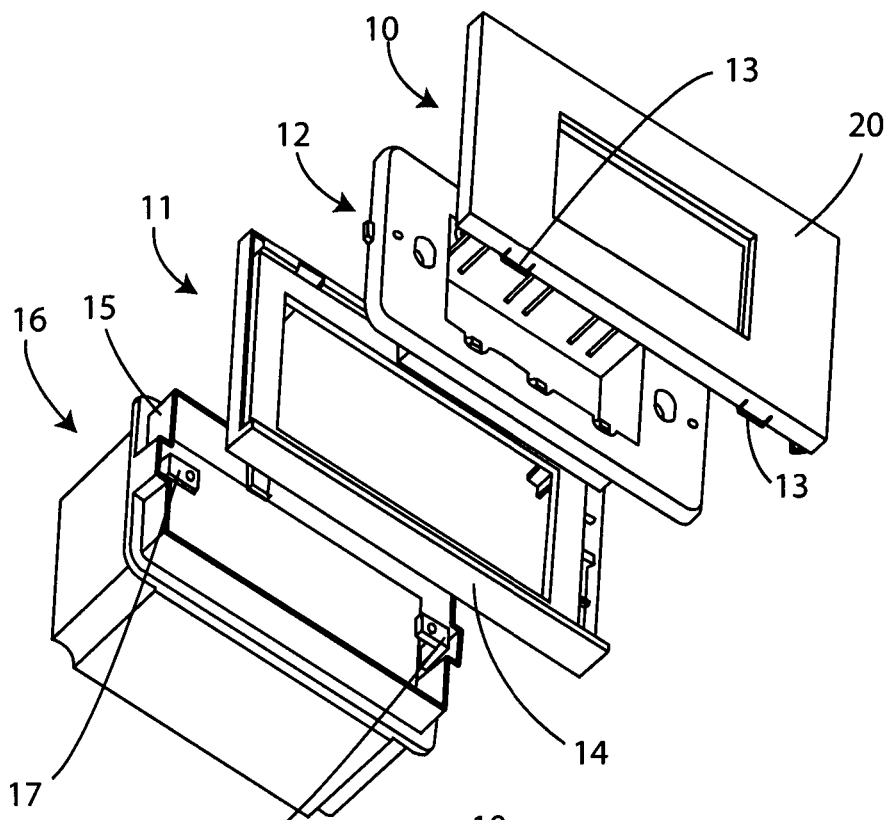
FIG. 1 is a first perspective exploded view of the built-in electromechanical equipment according to this invention.

With reference to the above-mentioned drawings, the built-in electromechanical equipment according to this invention is made of techno-polymer material and comprises a cover plate 10, which couples, using fastening hooks 13, to a functional frame 11, incorporating un socket-holder frame 12; the further original electromechanical equipment (not shown in the drawings) is not modified.

The frame 11 has a lower rim 14 on which the sensors of the equipment face and an extractable box 15 where a temperature sensor is located, whilst the plate 10 and the frame 11 are also coupled to the built-in box 16, which has two eyes 17 for the insertion of the screws for fastening the socket-holder frame 12.

In order to install and fix the equipment to the built-in box 16 the functional frame 11 is firstly installed, fixing it at the bottom to the socket-holder frame 12, in such a way that the frame 11 is blocked against the wall as it is compressed by the socket-holder frame 12 locked by the screws which are screwed on the eyes 17 of the box 16.

Subsequently, the cover plate 10 is installed, which, attaching to the functional frame 11 using suitable fastening hooks 13, fully closes the equipment.

The functional frame 11 incorporates all the active electronics of the equipment, including the RGB LEDs which illuminate the plate 10 in a very small thickness (less than 5 mm), not stealing space from inside the box 16; moreover, the plate 10 incorporates a light guide which illuminates uniformly the outer surface of the plate 10. Overall, it has a total thickness of less than 8-10 mm.

The functional frame 11 also incorporates the various sensors of the equipment, which face towards the outside on the small rim 14 protruding on the lower side of the frame 11; these sensors can be:
- a microphone,
- a light sensor (photodiode for measuring the ambient light),
- an active infrared proximity sensor,
- a gas sensor,
- a temperature sensor (the latter is housed in the extractable box 15 so that it can be moved away from the plate 10 by at least 1 cm to prevent the temperature measured from being that generated by the electromechanical equipment and that it, in fact, corresponds to the actual ambient temperature).

Figure 2:
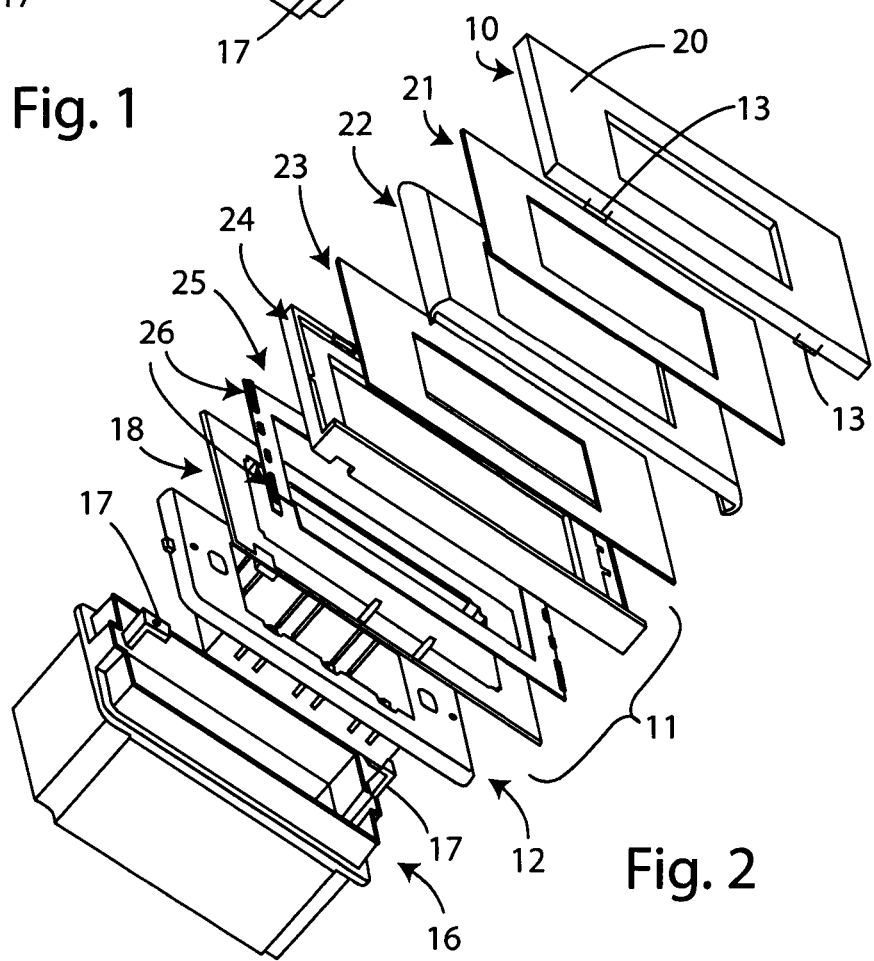
FIG. 2 is a second perspective exploded view with more detail of the built-in electromechanical equipment according to this invention.

More specifically, as shown in detail in FIG. 2, the equipment according to this invention consists of the plate 10, provided with a transparent cover 20, underneath which there may be a plate 21 made of opaline acting as an optical diffuser, a light guide 22, which, together with the transparent cover 20, constitutes the light emitter of the equipment, a coloured sheet 23, which defines the colour of the plate 10 with the LEDs switched OFF, whilst the functional frame 11 includes a cover 24, which incorporates an electronic circuit 25 equipped with RGB LEDs 26, and a base 18.

Figure 3:
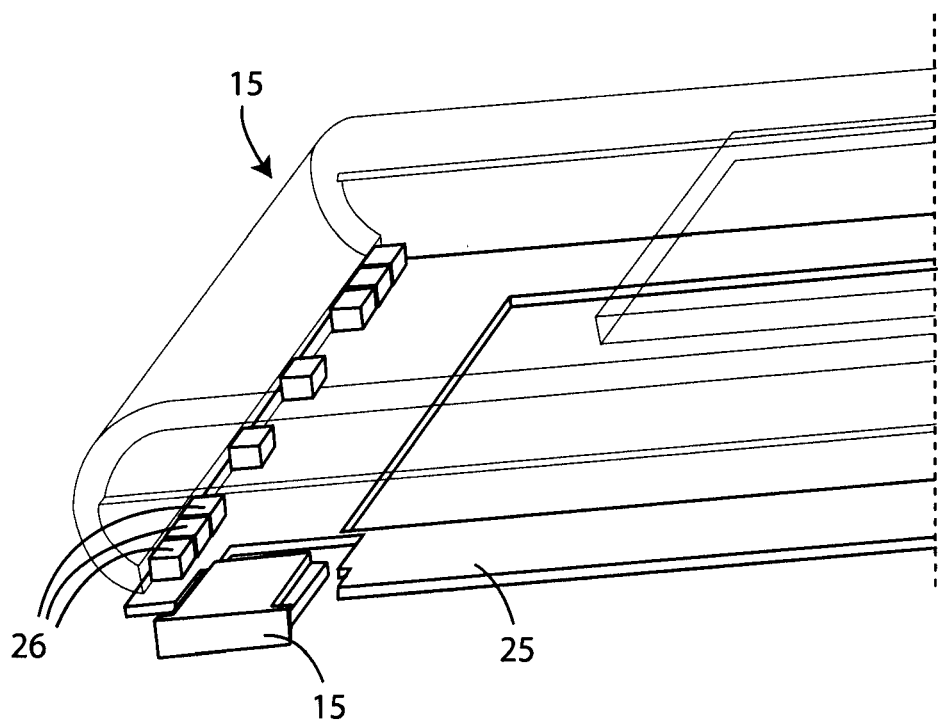
FIGS. 3, 4, 5, 6, 7 and 8 show detailed perspective views of the built-in electromechanical equipment, according to this invention.
Figure 4:
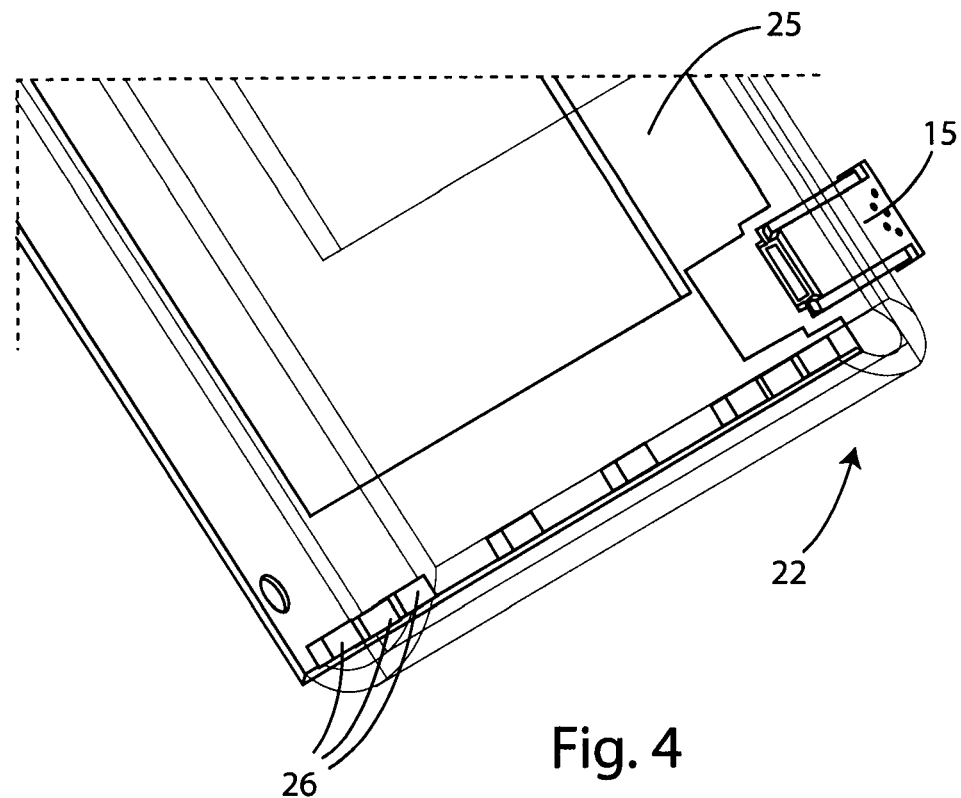
Figure 5:
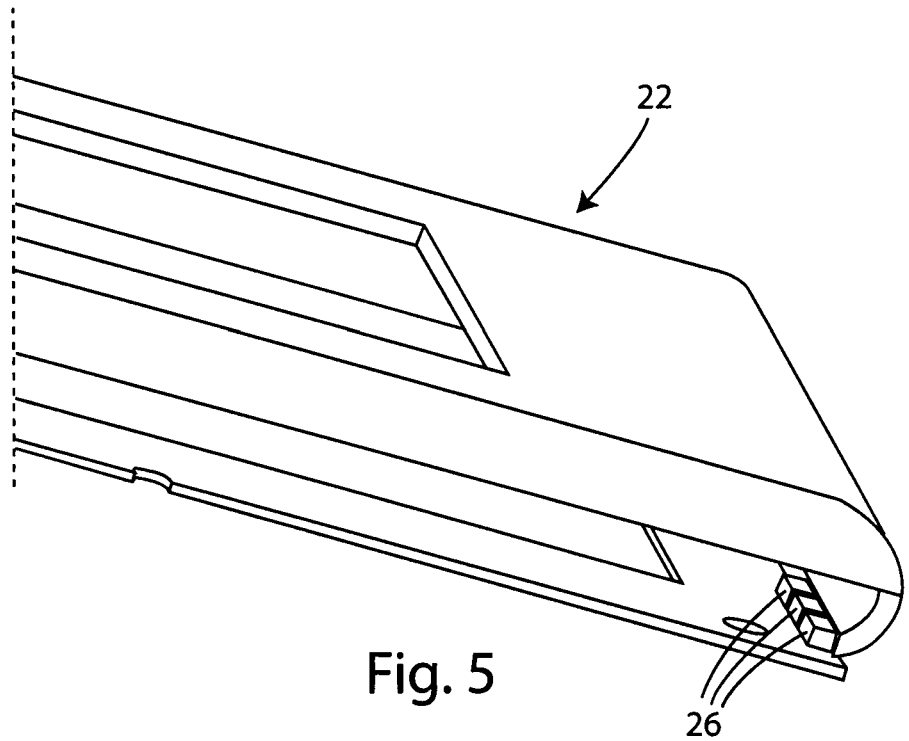

FIGS. 3, 4 and 5 show the electronic circuit 25 and the light guide 22 highlighting the optical coupling of the light guide 22 with the RGB LEDs 26; in particular, the light guide 22 is controlled by the LEDs 26 along the short ides of the rim of the guide 22 and, thanks to the shape and the materials used, the light is guided uniformly over the entire visible surface of the rim.

Figure 6:
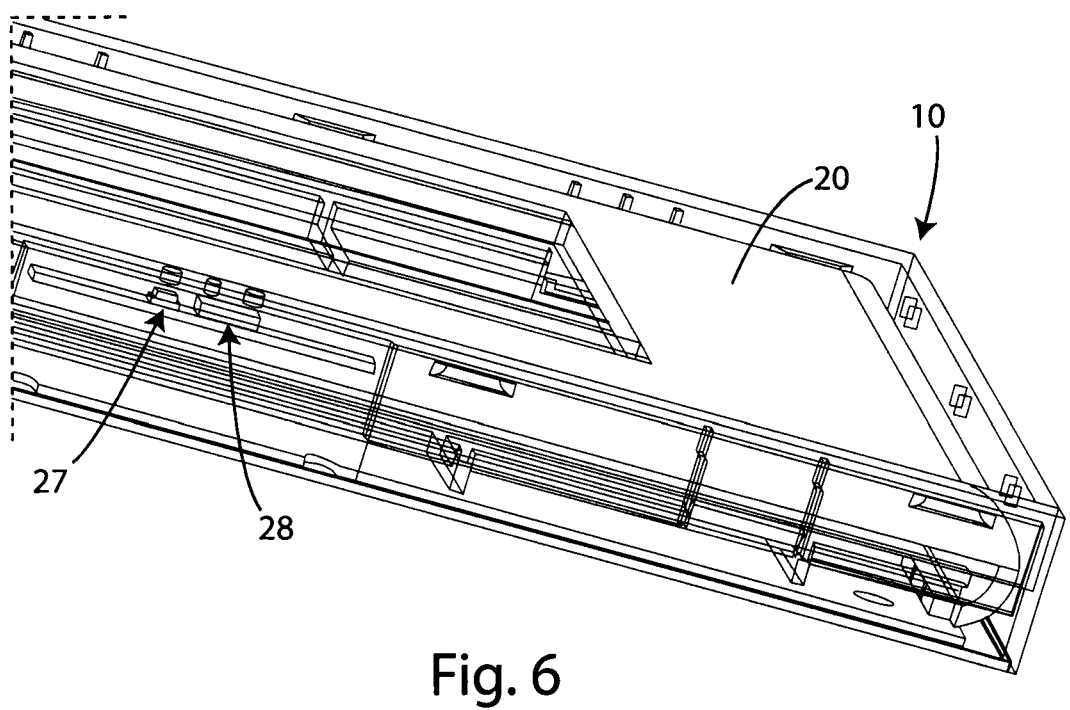
Figure 7:
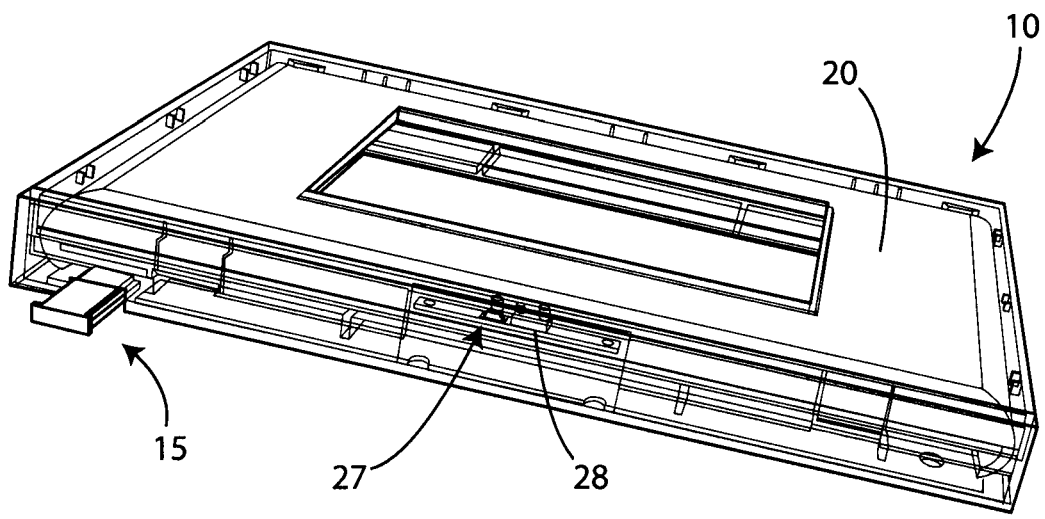
Figure 8:
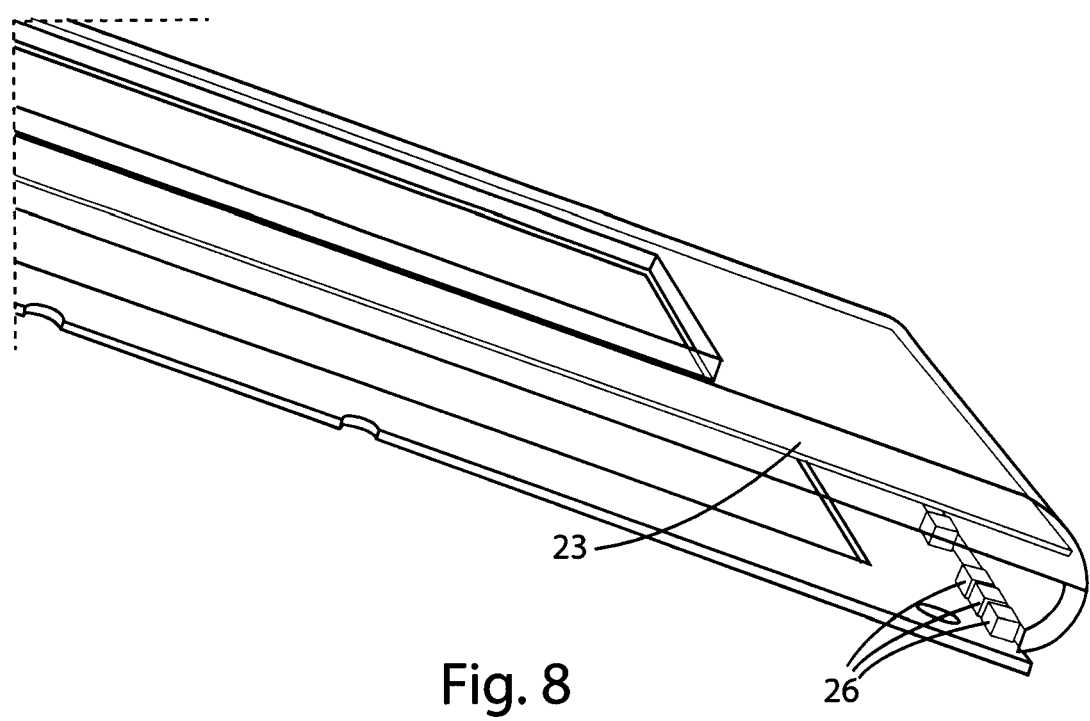

FIGS. 6 and 7 show the transparent cover 20 of the plate 10 fitted to close the equipment and the light sensors 27 and proximity sensors 28 mounted on a raised circuit, whilst FIG. 8 shows the coloured sheet 23, which is not transparent, which may be made of paper or plastic or other suitable material, which determines the colour which the plate 10 adopts, as seen by the user when the RGB LEDs 26 are switched OFF.

In this way, when the RGB LEDs 26 are switched OFF and therefore the plate 10 is switched OFF, the colour is that of the coloured sheet 23, which is interchangeable and chosen by the customer, who, therefore, determines the appearance; when the RGB LEDs 26 are switched ON the colour becomes that set by the LEDs 26 and the colour of the sheet 23 is completely "overwritten".

Moreover, the functional frame 11 is connected electrically to a power supply source present inside the box 16, by means of a pair of thin, sheathed copper wires which connect to a small off-line power supply unit 30 housed inside the box 16; these wires leave from behind the functional frame 11 and reach the inside of the box 16 from the inside of the socket-holder frame 12.

Figure 9:
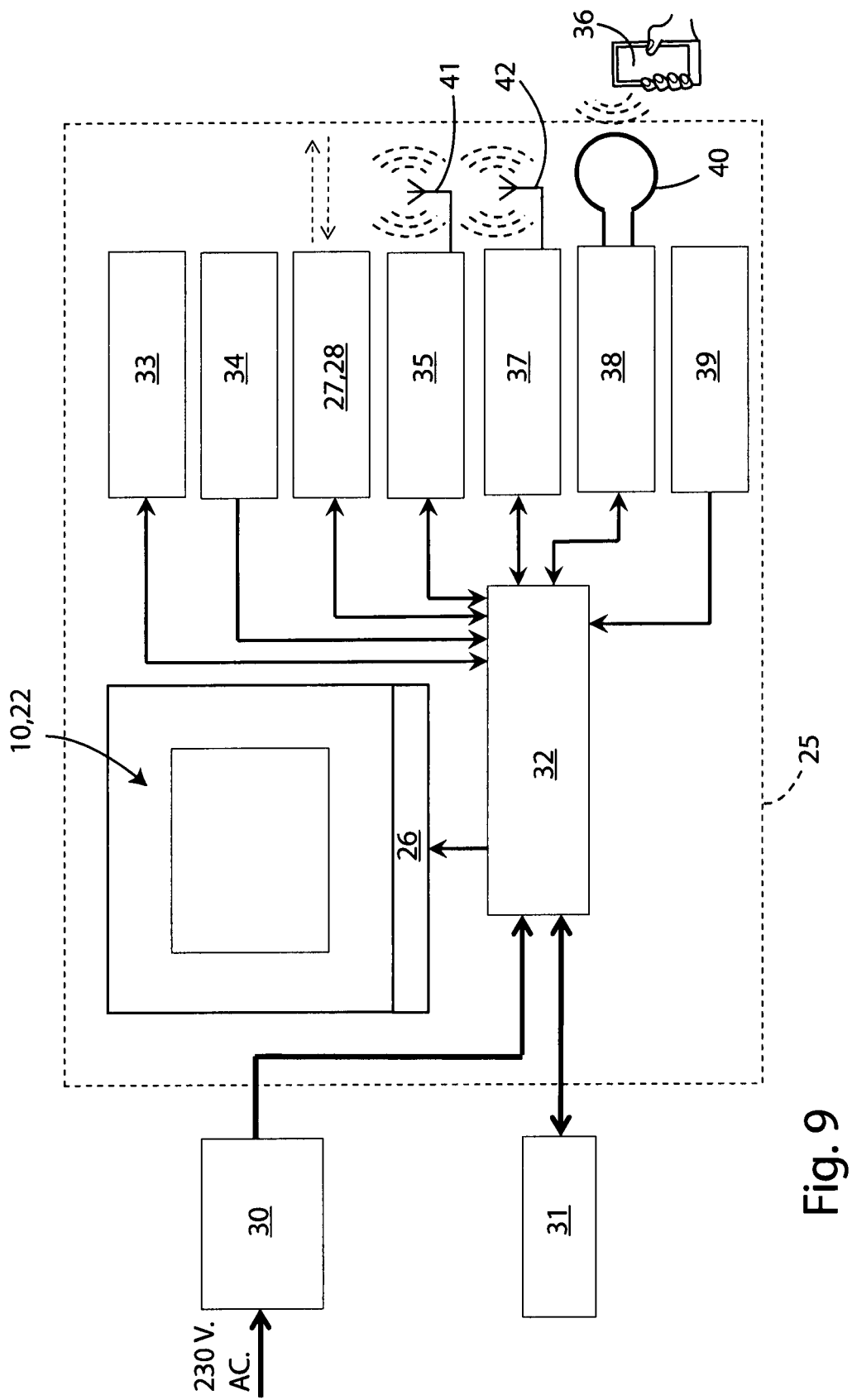
FIG. 9 shows a block diagram of the of the electronic operational circuit of the built-in electromechanical equipment according to this invention.
Figure 10:
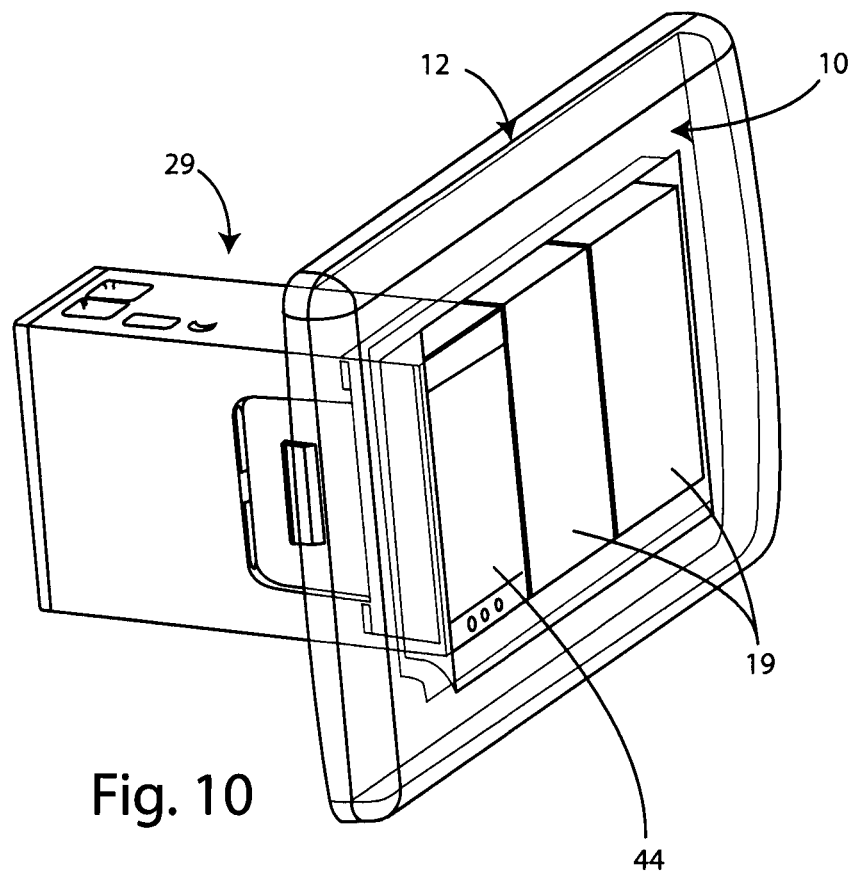
FIGS. 10, 11, 12 and 13 show a series of perspective views of a further embodiment of the built-in electromechanical equipment and, in particular, of a built-in home automation wall box, according to this invention.
Figure 11:
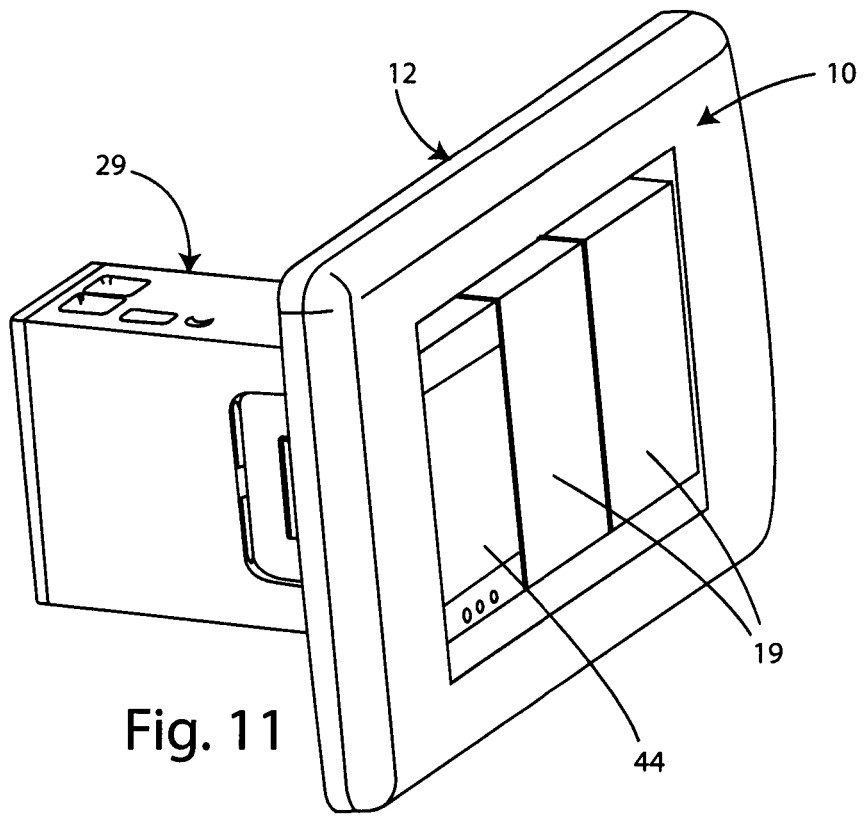
Figure 12:
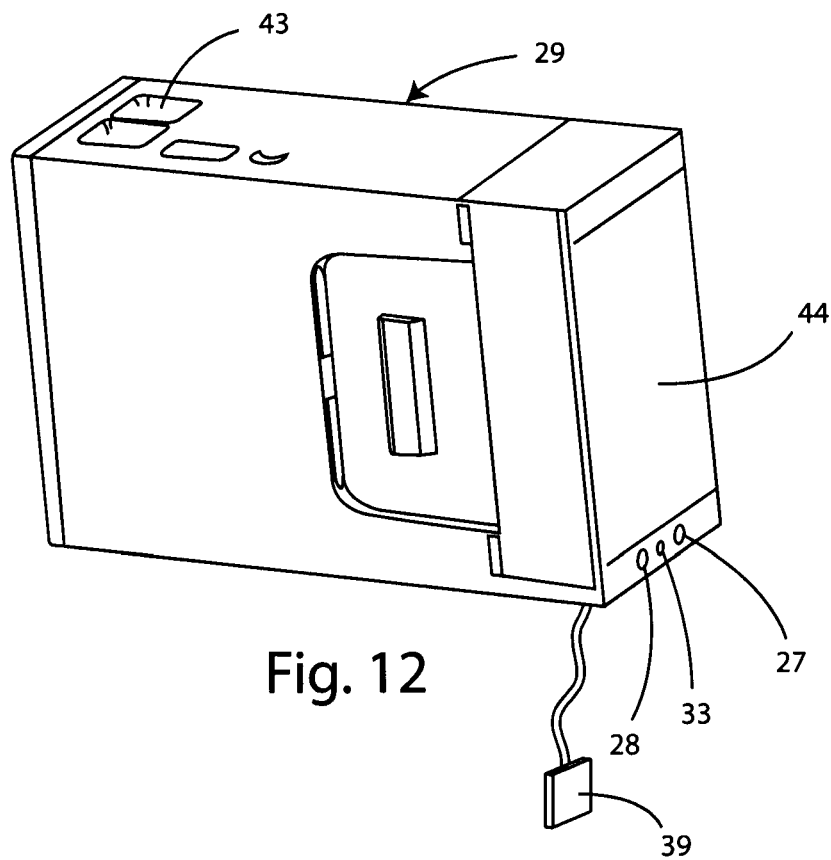

FIG. 9 shows the block diagram of the electronic circuit 25 of the equipment according to this invention, which comprises the following blocks:
- the main power supply unit (off-line converter) 30, which converts the 230V AC mains voltage to low voltage; this converter has the output safely insulated from the input and it is inserted inside the box 16;
- an optional battery 31, consisting of a backup energy device which is able to power the equipment for a few hours independently in the absence of mains supply; the battery 31 is automatically recharged by the main power supply unit 30 upon the return of the 230V AC power supply and it is inserted inside the box 16;
- a microcontroller 32, which controls and supervises the operation of the entire equipment, determining the status; in particular, the microcontroller 32 controls and manages the RGB LEDs 26 and the communication ports and analyses the sensors.

These sensors, as mentioned above, include:
- a microphone 33, consisting of an electroacoustic transducer with suitable signal conditioning circuit; the microphone 33 may have automatic gain control or be configured by the microcontroller 32 with fixed gain set by the microcontroller 32 itself;
- a gas sensor 34, consisting of a fuel gas CMOS microsensor, for control of the air quality and measurement of the hazardous gas concentration; the gas sensor 34 is of the extremely low power consumption type ($\approx 1$ mW);
- a proximity sensor 28, with infrared light emitter and sensor, consisting of a photo-sensor or photo-diode light receiver and the relative conditioning circuit, coupled with an infrared light photo-emitter, of the class 1 laser type for example; this sensor 28, by exploiting the reflection of objects close to the plate 10, acts as a short-distance proximity detector (within approx. 2 metres) for detecting hand commands, or for detecting individuals who pass in front of the plate 10;
- a light sensor 27, consisting of a photo-diode light receiver, with incorporated optical filter shaped according to the response of the human eye and relative signal conditioning circuit; this sensor 27 measures the ambient light and allows both implementation of a function for detecting movement inside the room in which the plate 10 is installed, based on the sudden variation of luminosity detected, and measurement of the absolute value of the ambient light for adjusting the intensity emitted by any radio-controlled lighting equipment present in the room;
- a BLUETOOTH® transceiver 35, consisting of a communication module based on the BLUETOOTH® standard, which allows communication with external devices compliant with the standard; for example, the plate 10 is thereby able to communicate with a smartphone 36 and receive commands or send information to the smartphone 36 which must be recorded and/or displayed (it is one of the wireless ports of the equipment according to the invention);
- a DSSS/WiFi spread spectrum transceiver 37, consisting of a communication module based on radio spread spectrum protocol at 2.4 GHz; it may be configured for implementing a proprietary protocol of the DSSS or FH/DSSS type, or for implementing communication based on the WiFi standard and allows communication with devices external to the plate 10 ((it is one of the wireless ports of the equipment);

an RFID tag with NFC communication 38, consisting of an RFID module with rewritable memory which is suitable for reading and writing from the outside using the NFC standard (Near Field Communication); this module may be read or written on from an external "mobile device", for example an enabled smartphone 36 and at the same time it may be read and written on from the microcontroller 32 of the equipment and, due to its nature, the tag may be read and written on from the external "mobile device" (which acts as "tag reader") even in the complete absence of power supply of the plate 10 (it is one of the wireless ports of the equipment);

a temperature sensor 39 facing the outside of the plate 10, consisting of a NTC with the relative conditioning circuit; it faces the outside of the box 15 for measuring the ambient temperature.

The RGB LEDs 26 are coupled to the light guide 22 and have the relative control circuits by which the microcontroller 32 can adjust the intensity of each string independently from the others.

The operation of the built-in electromechanical equipment for controlling devices installed in a building, according to this invention, is substantially the following.

The equipment, once installed, uses mains electricity for operation and, since it is a device which is always connected to the mains, the consumption in standby mode is minimised by the use of the power supply device 30 with extremely low consumption in standby mode (<200 mW).

The equipment is governed by the microcontroller 32, which controls its functions and it is formed mainly by the user's smartphone 36.

When the user moves the smartphone 36 (programmed with a suitable APP and thanks to the NFC port 40) close to the plate 10, the electronic circuit 25, stimulated by the action of the smartphone NFC tag, immediately starts a dialogue with the APP of the smartphone 36 allowing an automatic identification of the plate 10; an action resulting from this proximity identification is a dialogue using the BLUETOOTH® port 41 between the plate 10 and the smartphone 36, which therefore becomes the user interface of the plate 10 just identified.

In this way, the plate 10 can be programmed via BLUETOOTH® giving it specific information and by using the display the smartphone 36 can give feedback information to the user, thus facilitating the programming operations.

In fact, the APP of the smartphone 36 interacts with the plate 10 interrogating the microcontroller 32 of the electronic circuit 25, configuring the parameters and commands for actuating and/or reading of parameters and internal variables; for example, the smartphone 36 can send to the plate 10 effect and colour commands for the plate 10 or for the actuation of remote actuators connected via radio to the plate 10 (ON/OFF switching, programming ON/OFF switching, luminous intensity, etc.) or the smartphone 36 can read the temperature of the sensor 39 of the plate 10, or configure the functions.

The microcontroller 32, as well as governing the user interfaces, analyses the temperature measurements and those of the gas sensor 34 and supervises and manages the information messages coming from the wireless communication interfaces 35, 37 and 38.

On the basis of the version programmed in the microcontroller 32, all the following functions are possible, which can be activated and selected using the smartphone 36.

In a first luminous and coloured function of the plate 10, the user selects the colour and luminous intensity of the plate 10 and the mode of activation of the plate 10 amongst the following modes:

always ON;

only ON when the ambient light measured by the light sensor 27 is below a pre-set threshold;

only ON when the user is identified by the proximity sensor 28;

only ON when the presence of movement in the room is detected, thanks to the "activity" measurement detected by the light sensor 27 or by the microphone 33.

With this function, the plate 10 can function, for example, as a night light, activating only when the ambient luminosity drops below a certain limit, or at predetermined times or if a presence is detected or with variable intensity (such as lighting to read a book or with ambient lighting to illuminate an area of the house or to create an exclusive ambient with a predetermined coloured light) and/or with gradual switching OFF as the presence moves away; the plate 10, installed on a set of switches close to the bed, can in this way be used as a bedside light and, as such, can be programmed to switch ON at a pre-set wake-up time (for example, helping the waking up with pre-defined colours).

In the emergency light function, the plate 10, in the absence of a 230V AC mains power supply, lights up thanks to the power coming from the battery 31; in this way, the plate 10 behaves as emergency lighting equipment, illuminating the zone in which it is fitted. Every plate of the home can therefore transform into emergency lighting.

In the timer-thermostat function, the temperature sensor 39 is used for adjusting the temperature in the room in which the plate 10 is positioned; in fact, the plate 10 measures the ambient temperature and the microcontroller 32 controls the radio actuators (which are relay type radio actuators or solenoid valves directly controlling the hot water, or directly the boiler or the air conditioning system), as a function of the temperature profiles defined by the user. The plate 10 changes colour according to the ambient temperature measured, usually from blue (coldest) to red (warmest).

The timer-thermostat is conveniently configured by means of the interface of the smartphone 36 and the timer-thermostat function uses as output ports for the actuation the wireless (radio) ports 41, 42 connected to the remote wireless actuators; for example, the valves adjusting the air-conditioning system can be of the type with BLUETOOTH® interface or with DSSS interface and can therefore be controlled directly by the plate 10.

The plate 10 can also be the local unit for controlling lighting equipment equipped with wireless ports, for example BLUETOOTH, or WiFi or DSSS; in this case, the plate 10 sends, by means of one of the wireless ports 41, 42, commands for actuation of the lamps connected to it, which can be of various types, such as switching ON, switching OFF, setting of luminous intensity, setting of colour of the light, setting of the operation mode, etc.

The plate 10 can also use the light sensor 27 incorporated as a device for measuring the ambient light; the light measurements can thereby generate commands for adjusting the luminous intensity which the plate sends via a radio port to the lamps present in the room in which the plate 10 is fitted, thereby implementing a function for self-adjustment of the light, with the aim of automatically reducing the intensity of the light emitted by the lamps in the presence of natural light in the room or automatically increasing the light emitted by the lamps in the case of poor ambient light.

The light sensor 27 and the microphone 33 incorporated can detect the presence of persons in the room in which the plate 10 is positioned and therefore keep the lights switched ON only in the presence of noises and light variations, restoring the lights to the minimum luminosity, or switching them OFF in the case of prolonged periods of quietness in the room (that is, in the absence of noises and sudden variations in light for a certain predetermined period of time).

In the "safety" function, the plate 10 activates the infrared proximity sensor 28, the light sensor 27, the microphone 33 and, optionally, the gas sensor 34; in this way, the plate 10 can be configured as a household safety control device, either indecently or in combination with an anti-intrusion control unit, for example spreading lighting effects to dissuade intruders, simulating the presence of persons with the alarm active, activating itself in remote rescue mode or activating itself even in the case of a power failure.

The proximity sensor 28, the light sensor 27 and the microphone 33 can be used, also in a combined manner, for detecting the presence of persons in the room; the presence of a sound or a noise can be suitably analysed by the processor 32, and a sudden variation in luminosity read by the light sensor 27 can indicate the presence of a person. The plate 10 can then share this information with the adjacent plate and, by means of a suitable check algorithm distributed amongst the plates, process any information on the presence of intruders and transmit it by means of the wireless ports 41, 42 to an anti-intrusion system control unit. The active infrared proximity sensor 28 can immediately generate an alarm if it detects a presence in its field of action and, in a parallel scenario, the prolonged absence of movement and noise can automatically activate a series of wireless actuators, connected to the plate 10, which, for example, automatically close the blinds, switch OFF the lights and close the doors of the house, or generate an alarm due to absence of "life".

The gas sensor 34, if it is present, can provide an alarm signal when the concentration of gas measured exceeds a predetermined threshold and this information is transmitted by means of a wireless port 41, 42 to the anti-intrusion control unit.

In general, in the absence of the anti-intrusion control unit, the plate 10 can send the information to any domestic WiFi router, by means of the WiFi port 42, to transmit it to the user who is away from the house; the audio recorded by the plate 10, in this case, can be sent to the user, again using the WiFi channel, to allow the user to remotely check the situation.

The presence of the battery 31 allows the plate 10 to also operate in the absence of mains power supply.

In the "energy management" function, the plate 10 can manage, by means of the wireless ports 41, 42, one or more power and energy measurement devices wired inside the house and installed in series to the users and in series to the main ON/OFF switch of the electrical system. The plate 10 processes the information received from the remote measuring devices, all equipped with suitable wireless ports (of the BLUETOOTH®, WiFi or DSSS type) and, in this way, each plate 10 of the house can visually signal to the user (by means of the colour shown) the instantaneous or average electricity consumptions of the users and signal (by, for example, flashing) if the predetermined consumption thresholds are exceeded. The plate 10 can also be combined with wireless actuators which are able to switch OFF certain predefined users, in such a way that the above-mentioned plate 10 can therefore be the manager of the switching ON policies of these users according to the consumptions measured and the rules defined by the user (in order, for example, to limit the peak output of the domestic users, by activating an energy block, independently of or in line with the other plates of the system, after having measured a consumption exceeding a certain threshold).

In further embodiments shown in FIGS. 10, 11, 12 and 13, the built-in electromechanical equipment, according to this invention, has the same functions described above and comprises the plate 10, integrated with the socket-holder frame 12, which contains any other equipment of the traditional type of a closing cover 19, and a built-in home automation wall box 29, which incorporates the electronic devices contained in the electronic circuit 25 and is equipped with an input 43 of the power supply cables and a light emitter or guide 22, which, in this case, consists of the central zone of the front surface 44 of the home automation wall box 29.

As described above, home automation wall box 29 incorporates some sensors positioned in a zone below the front surface 44, such as the active infrared proximity sensor 28, the light sensor 27 and the microphone 33.

The home automation wall box 29 also incorporates the above-mentioned radio ports, any gas sensor and the NFC interface, as well as the microcontroller 32, which controls the functions as described previously.

Figure 13:
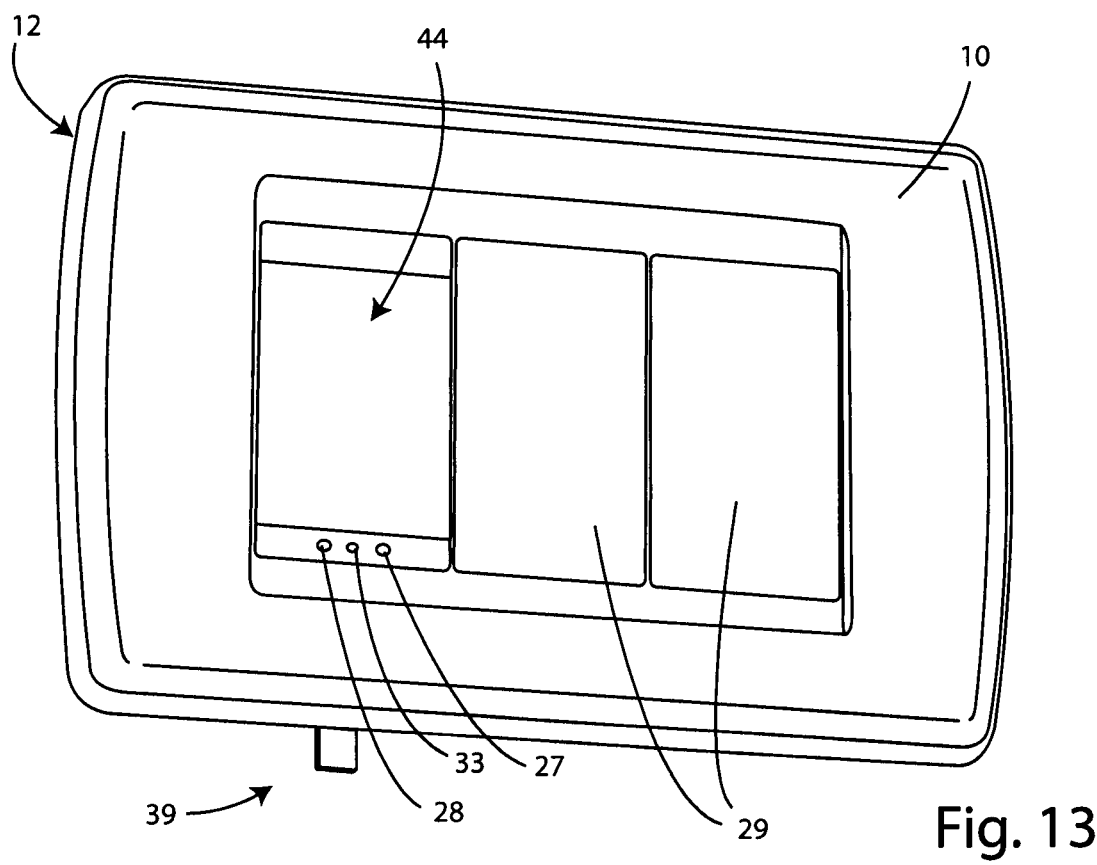

The home automation wall box 29 may also have the temperature sensor 39, which, once installed, is positioned immediately beneath the plate 10 and the frame 12, aligned on the lower side of the rime (as shown in detail in FIG. 13).

In this way, the temperature sensor 39 can correctly measure the temperature of the room in which it is installed without feeling the effects of the temperature of the built-in equipment, in particular without being influenced by the heat generated by the home automation wall box 29 itself.

The wall box 29 may or may not also be fitted with the mains power supply unit 30, in which case the user can connect to the wall box 29 directly at the input 43 the 230V AC power supply cables of the electrical system.

The battery 31 is optional and can be connected, or not, to the home automation wall box 29; as already mentioned, the battery 31 is usually housed inside the built-in box 16, inside of which the home automation wall box 29 is inserted, and it is connected to the wall box 29 with a special quick-coupling electrical connector.

The home automation wall box 29 is made in such a way as to adapt, by means of suitable mechanical adapters, to the majority of the frames of the existing civil series, so as to be integrated in existing systems and combined with electromechanical control devices of any type, conveniently introducing into the home automation functions described.

The technical features of the built-in electromechanical equipment according to this invention clearly emerge from the description, as do the advantages thereof.

In particular, these are represented by:
universal nature and adaptability of the plate and of the socket to all the socket-holder frames, by fastening by means of screws to the single standardised shared element (the socket-holder frame);
easy installation and very small overall thickness of the plate;
possibility of using the plate with a single coloured light emitter of any intensity and colour tone;
extremely low electricity consumption in standby mode;
integration of a series of sensors, such as microphone, light sensor, gas sensor, proximity sensor and temperature sensor;

integration of wireless ports, such as BLUETOOTH®, WiFi, DSSS, NFC;

illuminator function with adjustable intensity and colour of the light;

emergency light function;

timer-thermostat function;

activation of an anti-intrusion and general security system;

interface control function for actuation of electrical household appliances.

Lastly, it is clear that numerous other variants might be made to the electromechanical equipment in question, without forsaking the principles of novelty of the inventive idea, while it is clear that in the practical actuation of the invention, the materials, the shapes and the dimensions of the illustrated details can be of any type according to the requirements, and can be replaced by other equivalent elements.

What is claimed is:

1. A built-in electromechanical equipment for the control and command of devices in a building, comprising
   a cover plate (10),
   a functional frame (11), coupled to said cover plate (10),
   a socket holder frame (12) and
   a mounting box (16), so that
   said socket holder frame (12) is fastened to said mounting box (16) and said functional frame (11) is held tightly to said mounting box (16) by means of said socket holder frame (12),
   wherein said mounting box (16) contains a power supply device (30) and said functional frame (11) has a lower protruding rim (14) on which a series of sensors (34, 28, 27, 39) are positioned; said functional frame (11) being equipped with an electronic circuit (25), which comprises a series of LEDs (26), a microcontroller (32) and a series of communication ports (40, 41, 42), so that said microcontroller (32) analyses, controls and manages said LEDs (26), said series of communication ports (40, 41, 42) and said sensors (34, 28, 27, 39), and wherein
   a light guide (22) is placed in between said plate (10) and said functional frame (11), said light guide (22) being coupled to said LEDs (26) and being configured to illuminate in a uniform manner at least one external surface portion (44) of said cover plate (10),
   characterized in that said plate (10) is provided with a transparent cover (20) underneath which there is a plate (21) made of opaline.

2. The electromechanical equipment according to claim 1 characterised in that said electronic circuit (25) comprises
   a BLUETOOTH® transceiver (35), equipped with a first wireless port (41), which allow the communication with a smartphone (36) compliant with the BLUETOOTH® standard,
   a DSSS/WiFi spread spectrum transceiver (37), equipped with a second wireless port (42) and configured to implement a communication with external devices based on the DSSS or WiFi standard, and
   a RFID tag with NFC communication (38), equipped with a third wireless port (40) and configured to implement NFC communication with said smartphone (36),
   so that said smartphone (36) is configured to control and program said equipment, via BLUETOOTH®, through said first wireless port (41) and said microcontroller (32), varying the colours and the luminous intensity of the surface of said cover plate (10) and the methods of activating said LEDs (26) and said light guide (22).

3. The electromechanical equipment according to claim 1, characterised in that said functional frame (11) incorporates all the active electronics of the equipment, including the RGB LEDs, in a thickness less than 5 mm.

4. The electromechanical equipment according to claim 1, characterised in that said sensors include a microphone (33), a gas sensor (34), a proximity sensor (28), an ambient light sensor (27) and a temperature sensor (39) which is positioned on a box (15) facing the outside of said functional frame (11).

5. The electromechanical equipment according to claim 1, characterised in that said methods of activating the LEDs (26) and the light guide (22) comprise the operation of the plate (10) as a night light and as an emergency light thanks to the power supply of a battery (31), as well as the switching ON and/or OFF at pre-set times, the switching ON and/or OFF if a presence is detected, the switching ON and/or OFF with variable luminous intensities and the switching OFF with gradual intensity as the presence moves away.

6. The electromechanical equipment according to claim 1, characterised in that said methods of activating the LEDs (26) and the light guide (22) include the operation of the plate (10) as a timer-thermostat by using the measurements of said temperature sensor (39) and the radio commands, through at least one of the wireless ports (41, 42), of said microcontroller (32) to a plurality of actuators, as a function of the temperature profiles defined and programmed using the smartphone (36).

7. The electromechanical equipment according to claim 1, characterised in that said plate (10) is configured for forming a local unit for controlling lighting equipment equipped with wireless ports, so as to send, using at least one of the wireless ports (41, 42), commands for actuating a series of lamps connected to the plate (10).

8. The electromechanical equipment according to claim 1, characterised in that said plate (10) is configured as a household safety device, either autonomously or in combination with an anti-intrusion control unit, for detecting the presence of persons in a room, the presence of a sound or a noise, the presence of gas in a room above a pre-set threshold and/or a sudden variation in luminosity, and/or to send commands for actuating blinds, lights, doors, and/or alarms.

9. The electromechanical equipment according to claim 1, characterised in that said plate (10) is configured to manage, using at least one of the wireless ports (41, 42), one or more power and energy measurement devices of a building which are placed in series to the users and in series to the main ON/OFF switch of the electrical system and to visually signal the instantaneous or average electricity consumptions of the users and/or whether predetermined consumption thresholds are exceeded, so as to switch OFF some predetermined users and limit the peak power of the household users.

10. The electromechanical equipment according to claim 1, characterised in that said functional frame or box (11, 29) is equipped with an input (43) of the power supply cables and with a light emitter in a central zone of the front surface (44) of the box (29).

11. The electromechanical equipment according to claim 9, characterised in that said functional frame or box (11, 29) has a plurality of sensors positioned in an area situated below said front surface (44).

12. The electromechanical equipment according to claim 9, characterised in that said functional frame or box (11, 29) has a mains power supply unit (30), whilst an optional battery (31) is housed in said built-in box (16), inside which said functional frame or box (11, 29) is placed, and said battery (31) is connected to said functional frame or box (11, 29) by means of an electrical connector.

13. The electromechanical equipment according to claim 9, characterised in that said functional frame or box (11, 29) is configured so as to adapt, by means of mechanical adapters, to a plurality of frames of electrical equipment, in such a way as to be integrated in existing electrical systems and combined with different types of electromechanical control devices.

* * * * *